J. D. AXTELL.
AUTOMOBILE BED.
APPLICATION FILED FEB. 10, 1916.

1,210,583.

Patented Jan. 2, 1917.
2 SHEETS—SHEET 1.

Inventor
John D. Axtell
By Wm. W. Babcock & Son
Attorneys

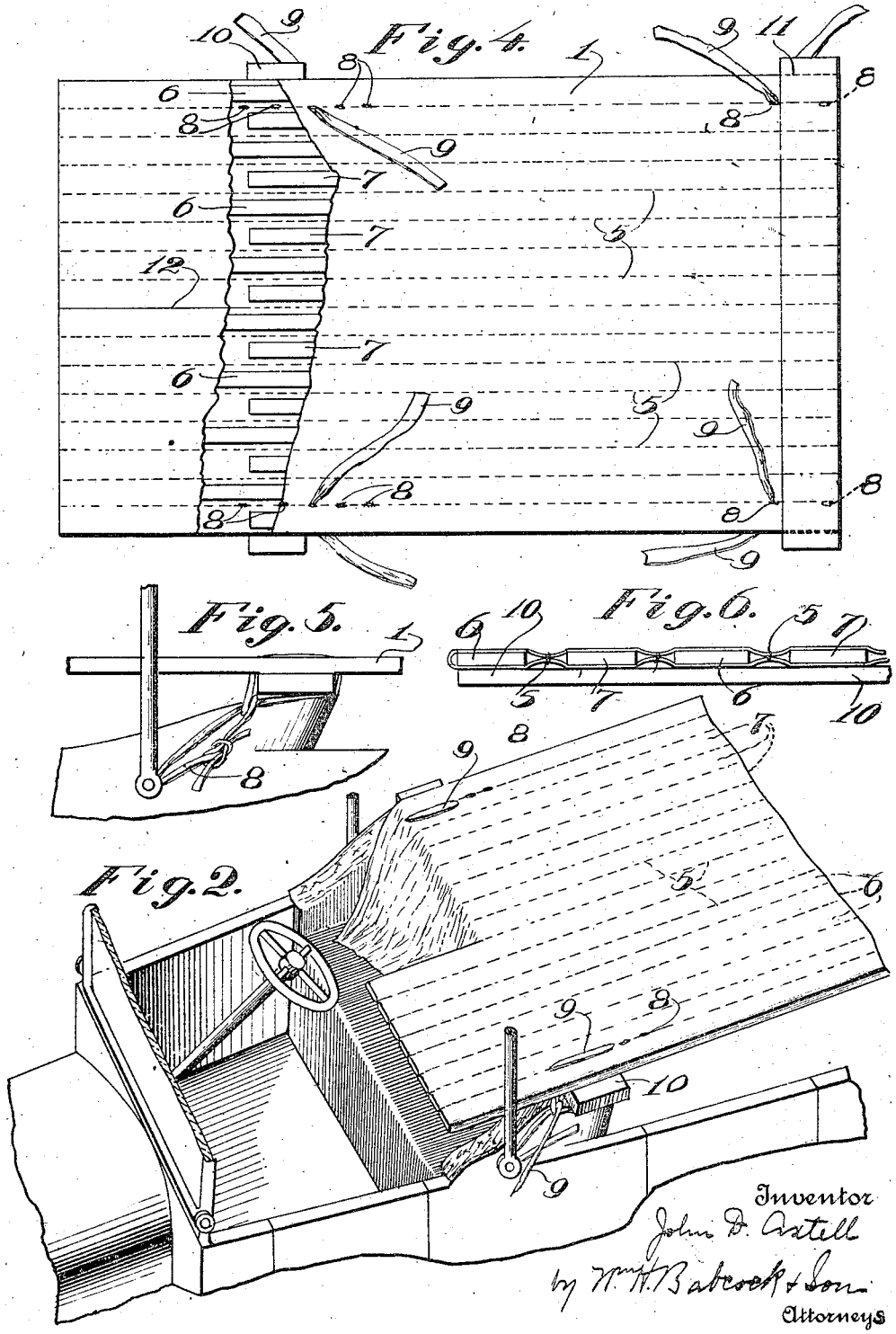

UNITED STATES PATENT OFFICE.

JOHN D. AXTELL, OF LA JOLLA, CALIFORNIA.

AUTOMOBILE-BED.

1,210,583.  Specification of Letters Patent.  Patented Jan. 2, 1917.

Application filed February 10, 1916. Serial No. 77,447.

*To all whom it may concern:*

Be it known that I, JOHN D. AXTELL, a citizen of the United States, residing at La Jolla, in the county of San Diego and State of California, have invented certain new and useful Improvements in Automobile-Beds, of which the following is a specification.

This invention relates to beds to be used primarily in connection with automobiles and has for its objects to provide a bed, which, when not in use, may be rolled up and carried on the step or mud-guard, which may be used full size for purposes of rest over night or camping on the road with any automobile, or which may be used as an ambulance while leaving plenty of room for the driver of the car behind the steering wheel.

Further objects are to prevent turning, endwise or lateral movement of the bed when in position, to support the front end of the bed so that all the slats thereof will be in the same horizontal plane, to prevent the ends of the slats from swinging upward from the supporting edge of the back of the rear seat when any weight is placed on their front ends only, and to reduce the cost of manufacture, simplify the construction and increase the durability of the bed, all of which objects are accomplished by the construction, combination and arrangement of parts all as hereinafter more particularly set forth and claimed.

Figure 1:
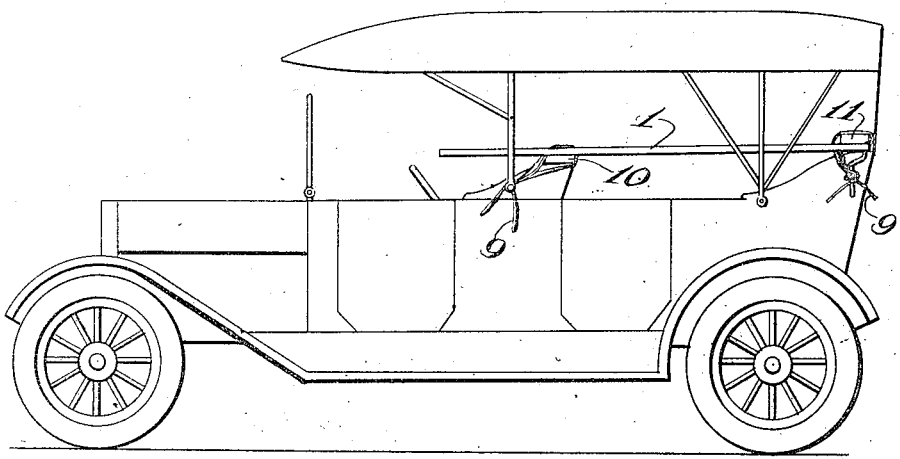
Figure 3:
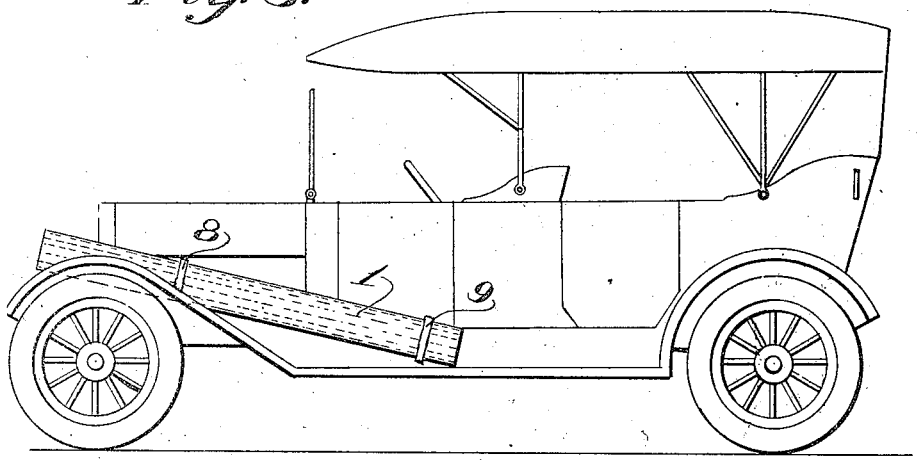

In the accompanying drawings: Figure 1 represents a perspective view of my invention as applied to an automobile, the different length slats being arranged alternately to produce a bed of full width throughout its entire length, for camping purposes in conjunction with the usual full or standard size touring automobile; Fig. 2 represents a similar view of the slats shifted, all the long slats 6 being on the side of the division 12 away from the steering wheel and all of the slats 7 being on the steering wheel side of the division 12, the extra part of the tick extending beyond the ends of slats 7 being folded down on the back of the front seat out of the way, for use as an ambulance or for use with a small automobile for camping purposes; Fig. 3 represents a similar view, the bed being rolled up and carried on the outside, one end on the step, the other lying between the mud-guard or fender and the hood, for touring; Fig. 4 represents a plan view of the bed, the canvas or other textile tick being broken away to show the different lengths of the alternate slats; Fig. 5, a detail view of the transverse bar 10, the means of fastening the same in place and the means of securing the bed, as a whole, to one of the posts or other projecting parts on the top or body of the automobile; and Fig. 6 represents a detail view, broken away, of the open end of the bed.

Any suitable material may be used for the various parts, the materials herein mentioned for any particular part, however, being preferred by me. In practice the standard size of this article will be adapted for use with the usual or standard size touring automobile, although it will be capable of use with much smaller automobiles, though with a less degree of comfort. As used with the standard size touring automobile the front edge of the bed will be in the same vertical plane with the edge of the front seat, allowing plenty of room in front thereof for dressing in comfort, as shown in Fig. 1.

Referring now in detail to the drawings, 1 represents the canvas tick having its sides 2 and end 3 closed by sewing, or other suitable means and its front end open, as shown in Fig. 6. The two parts of this tick are sewed or otherwise secured together at regular intervals by seams 5 to form pockets extending longitudinally of said tick. Two series of slats 6 and 7, the slats 6 being longer than the slats 7, are adapted to be inserted in said pockets in any longitudinal arrangement desired to meet the particular conditions present in any individual automobile and inherent in the particular use to which the bed is to be put. To provide a full width bed for its entire length, as shown in Fig. 1, the slats 6 and 7 should be arranged alternately, as shown in Fig. 4. To allow space behind the steering wheel for the driver and use the bed for ambulance purposes, the long slats 6 will all be shifted to the side of the division 12 away from the steering wheel and the short slats 7 will all be shifted to the steering side of the division 12, as shown in Fig. 2. This latter arrangement is also to be used when the car is so small that the steering wheel will not permit of the full width arrangement for the entire length of the bed, though in this case so complete a shift may not be necessary, depending on the size of the car and the size and position of the steering wheel.

To allow the portion of the tick extending beyond the ends of the slats 7 to fall or be folded down out of the way when the slats 6 and 7 have been shifted to adapt the bed for ambulance purposes, as illustrated in Fig. 2 and above described, I divide the tick longitudinally in its middle, as at 12, from its front edge back for a distance corresponding to the difference in length between the long slats 6 and the short slats 7, as shown in Fig. 4, this distance corresponding to the width of the usual front seat.

The slats 6 and 7 are preferably of wood of sufficient width, thickness and strength to bear the burden imposed on them and the short slats 7 are of sufficient length to rest on the top edge of the back of the rear seat and to extend over the top of the back of the front seat and rest on the support 10 laid thereon when used with the usual or standard size touring automobile. In a smaller car their front ends would project forward slightly beyond the upper edge of the back of the front seat.

All of the slats 6 and 7 and the rods 10 and 11 are of such dimensions in width and thickness as to permit the bed as a whole to be rolled up into a bundle, as shown by Figs. 3, 4 and 6.

For the purpose of supporting the front end of the bed I provide a transverse bar 10, of greater thickness, width and strength than the slats 6 and 7, to be placed on the upper edge of the back of the front seat, the bed resting on this bar. This will keep the bed all in the same horizontal plane and is especially important where the edge of the back of the front seat is curved or irregular in outline. To secure this bar 10 and this part of the bed in place and guard against longitudinal and lateral movement thereof I provide at this point on each side, on the inside of the outer slat, a series of holes 8 passing through the tick, the edges of these holes being metal bound or otherwise suitably reinforced, as shown in Figs. 4 and 5. A tape 9 is passed through preferably two of these holes 8 in each respective series, tied tightly around its respective end portion of the rod 10 and then drawn tight and tied around the posts or other adjacent projecting parts of the top or body of the automobile, as shown in Figs. 1, 2 and 5. By having these holes 8 arranged in series on each side the rod 8 may be easily adjusted in position with relation to the bed so that it will rest on the top edge of the back of the front seat of different sizes of automobiles. This bar 10 may of course be secured in position by any other convenient and suitable means.

To hold the rear end of the bed and the rear ends of the individual slats 6 and 7 down on the upper edge of the back of the rear seat a rod 11, similar to rod 10, is provided arranged transversely on the top of the bed, the bed with its individual slats 6 and 7 being between said rod 11 and the upper edge of the back of the rear seat. The tick is provided on each side, inside of the outer slat, with two holes 8, bound or reinforced as above described, one hole of each pair being on each side of the transverse rod 11, said rod 11 and the rear end of the bed being secured in position by tapes 9 in the manner described with regard to the rod 10. These tapes 9 hold the bed in position and, when drawn tight, prevent all twisting, longitudinal, lateral and vertical movement; also, they are to be used for tying the bed up in roll-form for carrying on the step and mud-guard or fender when not in use.

Having thus described my invention, what I claim as new and desire to secure by Letters Patent is:

1. A bed comprising a tick longitudinally divided into pockets and having one end open, and two series of long and short slats adapted to be inserted in said pockets in any desired arrangement, in combination with means for securing said bed in position on the backs of the seats of an automobile.

2. An automobile bed comprising a tick having an open end, means dividing said tick longitudinally into pockets and slats of different lengths adapted to be inserted in, and withdrawn from said pockets at will through their open ends, in combination with flexible means for securing said bed in position on the backs of the seats of an automobile.

3. An automobile bed comprised of a tick longitudinally divided for a part of its length and having an open end, means dividing said tick longitudinally into pockets and slats of different lengths adapted to be inserted in any desired arrangement in said pockets, all of said slats being of sufficient length to extend over the edges of the backs of the front and rear seats of an automobile, in combination with means for securing said bed in position.

4. An automobile bed adapted to be rolled up when not in use and comprising a tick, a plurality of slats of different lengths adapted to be inserted in said tick in any desired arrangement, and means for spacing said slats apart when thus inserted, in combination with means for securing said bed in position on the backs of the front and rear seats of an automobile.

5. An automobile bed adapted to be rolled up when not in use and comprising a tick, a plurality of slats of different lengths adapted to be inserted into said tick in any desired longitudinal arrangement, and means spacing said slats apart when thus inserted, in combination with means resting on the edge of the back of the front seat transversely of the bed for supporting the front portion of the latter and means for securing said bed in position.

6. An automobile bed adapted to be rolled up when not in use and comprising a tick, a plurality of slats of different lengths adapted to be inserted into said tick in any desired longitudinal arrangement and means spacing said slats apart when thus inserted, in combination with means for supporting the front portion of said bed, means preventing the vertical movement of the rear end of the individual slats and means for securing said bed in position on the backs of the front and rear seats of an automobile.

7. An automobile bed adapted to be rolled up when not in use and comprising a tick longitudinally divided for a part of its length, a plurality of slats of different lengths adapted to be inserted into said tick in any desired arrangement, and means for spacing said slats apart when thus inserted, in combination with means for securing said bed in position on the backs of the front and rear seats of an automobile, the longitudinal division of said tick for a part of its length allowing a part of said tick to fold down out of the way in one arrangement of the slats.

8. In automobile beds, a flexible tick longitudinally divided for a part of its length and adapted to receive a plurality of slats in spaced relation to each other.

In testimony whereof, I have signed my name to this specification in the presence of two subscribing witnesses.

JOHN D. AXTELL.

Witnesses:
 ALETHEA DEMPSEY,
 Mrs. S. C. DEMPSEY.